(12) United States Patent
Shimodaira et al.

(10) Patent No.: US 7,773,174 B2
(45) Date of Patent: Aug. 10, 2010

(54) WIDE VIEWING ANGLE COMPENSATION POLARIZING PLATE, LIQUID CRYSTAL PANEL AND LIQUID CRYSTAL DISPLAY

(75) Inventors: Kiichi Shimodaira, Ibaraki (JP); Hiroyuki Okada, Ibaraki (JP); Tatsuya Oosuka, Ibaraki (JP); Yuuichi Nishikouji, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 741 days.

(21) Appl. No.: 11/629,171

(22) PCT Filed: May 24, 2005

(86) PCT No.: PCT/JP2005/009393

§ 371 (c)(1),
(2), (4) Date: Dec. 11, 2006

(87) PCT Pub. No.: WO2005/121847

PCT Pub. Date: Dec. 22, 2005

(65) Prior Publication Data

US 2008/0303995 A1    Dec. 11, 2008

(30) Foreign Application Priority Data

Jun. 14, 2004    (JP) ............................. 2004-175807

(51) Int. Cl.
*G02F 1/13363* (2006.01)
*G02B 5/02* (2006.01)

(52) U.S. Cl. .................. 349/96; 349/112; 349/120; 359/500; 359/599

(58) Field of Classification Search .................. 349/96, 349/112, 117, 118, 120; 359/499, 500, 599; 428/1.3, 1.31
See application file for complete search history.

(56) References Cited

U.S. PATENT DOCUMENTS

| 4,929,523 A | 5/1990 | Kitayama et al. |
| 5,108,857 A | 4/1992 | Kitayama et al. |
| 6,064,457 A * | 5/2000 | Aminaka ..................... 349/117 |

(Continued)

FOREIGN PATENT DOCUMENTS

EP    272582 A2    6/1988

(Continued)

OTHER PUBLICATIONS

International Search Report of PCT/JP2005/009393, date of mailing Jun. 28, 2005.

(Continued)

*Primary Examiner*—Dung T Nguyen
*Assistant Examiner*—Tai Duong
(74) *Attorney, Agent, or Firm*—Westerman, Hattori, Daniels & Adrian, LLP (57) ABSTRACT

A wide viewing angle compensation polarizing plate of the invention comprises a laminate comprising an optical film (1) that is formed of an obliquely oriented material exhibiting optically-negative uniaxiality, an anisotropic light-scattering film (2) and a polarizer (3). The wide viewing angle compensation polarizing plate can widen viewing angle characteristics both in the lateral and vertical directions with respect to the direction of the normal to the screen when used in liquid crystal displays.

10 Claims, 4 Drawing Sheets

U.S. PATENT DOCUMENTS

| | | |
|---|---|---|
| 6,330,108 B1 | 12/2001 | Nishikouji et al. |
| 6,424,395 B1 | 7/2002 | Sato et al. |
| 6,933,994 B1 * | 8/2005 | Kaneko et al. ............... 349/112 |
| 2004/0125451 A1 | 7/2004 | Miyatake |
| 2005/0001957 A1 * | 1/2005 | Amimori et al. ............ 349/112 |

FOREIGN PATENT DOCUMENTS

| | | |
|---|---|---|
| JP | 64-77001 A | 3/1989 |
| JP | 2000-171619 A | 6/2000 |
| JP | 2001-91745 A | 4/2001 |
| JP | 2002-90527 A | 3/2002 |
| JP | 2003-195051 A | 7/2003 |
| JP | 2003295167 A | 10/2003 |
| JP | 2004-070345 A | 3/2004 |
| WO | WO 02/101447 A1 | 12/2002 |

OTHER PUBLICATIONS

Japanese Office Action dated Jul. 31, 2009 issued in corresponding Japanese patent Application No. 2004175807.

* cited by examiner

WIDE VIEWING ANGLE COMPENSATION POLARIZING PLATE, LIQUID CRYSTAL PANEL AND LIQUID CRYSTAL DISPLAY

TECHNICAL FIELD

The invention relates to a wide viewing angle compensation polarizing plate and a liquid crystal panel using the wide viewing angle compensation polarizing plate. In particular, the wide viewing angle compensation polarizing plate of the invention is useful when it is stacked on the viewer side of a liquid crystal cell to form a liquid crystal panel. The liquid crystal panel of the invention is suitable for use in liquid crystal displays.

BACKGROUND ART

Liquid crystal displays, which are used in various fields, have some inherent viewing angle characteristics due to their principles. Thus, there is a demand for wider viewing angle characteristics.

For example, there are methods of widening the viewing angle characteristics of a liquid crystal display by selecting the pattern of the arrangement of liquid crystal molecules in a liquid crystal cell. For example, display modes such as TN mode, STN mode, IPS mode, and VA mode are proposed. These modes differ in their viewing angle characteristics and each have a merit and a demerit.

The viewing angle characteristics of liquid crystal displays are significantly influenced by a combination of the absorption axis of a polarizer and the direction of the orientation of liquid crystal molecules in a liquid crystal cell or by the retardation of a liquid crystal cell, or the like. In view of these matters, there are methods for widening the viewing angle characteristics of a liquid crystal display by the use of an optical compensation film that provides visibility for a liquid crystal panel.

A variety of optical compensation films are proposed such as products based on a retardation film using a polymer material such as polycarbonate and products using a liquid crystal polymer film. Examples of the liquid crystal polymer film include a twisted retardation film in which liquid crystal molecules are twisted with respect to the in-plane direction of the film and a product using a discotic or nematic liquid crystal that has uniaxiality to a certain extent with respect to the direction of the normal to the film plane and also has a specific tilt angle with respect to its cross-sectional direction. In particular, the discotic liquid crystal, which is a material exhibiting optically negative uniaxiality, is used and obliquely oriented to form an optical compensation film. A specific example of such a film is WV Film manufactured by Fuji Photo Film Co., Ltd. The optical compensation film using the discotic liquid crystal has been used as a viewing angle-widening film in TFT type liquid crystal displays or the like using a TN (90° twist) mode liquid crystal cell to improve the viewing angle characteristics of liquid crystal displays (for example, see Patent Literatures 1 and 2 below).

In the case where the optical film using the discotic liquid crystal is used in liquid crystal displays, with respect to the direction of the normal to the screen, the viewing angle characteristics can be widened in the lateral direction, but the widening of the viewing angle characteristics in the vertical direction (particularly in the downward (lower) direction) is not sufficient. In general, the optical film using the discotic liquid crystal is also unsatisfactory for the color shift to yellow in the film.

Patent Literature 1: Japanese Patent Application Laid-Open (JP-A) No. 2001-91745
Patent Literature 2: JP-A No. 2002-90527

DISCLOSURE OF INVENTION

Problems to be Solved by the Invention

It is an object of the invention to provide a wide viewing angle compensation polarizing plate that can widen viewing angle characteristics both in the lateral and vertical directions with respect to the direction of the normal to the screen when used in liquid crystal displays. It is another object of the invention to provide a wide viewing angle compensation polarizing plate that can widen viewing angle characteristics and suppress coloring of displayed images.

It is a further object of the invention to provide a liquid crystal panel using the wide viewing angle compensation polarizing plate and to provide a liquid crystal display using the liquid crystal panel.

Means for Solving the Problems

As a result of active investigations for solving the above problems, the inventors have found that the objects can be achieved by the wide viewing angle compensation polarizing plate described blow and have completed the invention.

The present invention related to a wide viewing angle compensation polarizing plate, comprising:
a laminate comprising an optical film (1) that is formed of obliquely oriented material exhibiting optically-negative uniaxiality, an anisotropic light-scattering film (2) and a polarizer (3).

The wide viewing angle compensation polarizing plate of the invention includes a laminate comprising a polarizer (3), an optical film (1) that is made of an obliquely oriented material exhibiting optically negative uniaxiality and stacked thereon, and an anisotropic light-scattering film (2) further stacked thereon. Only the optical film (1) cannot sufficiently widen the viewing angle characteristics and the like in the vertical direction (particularly in the downward direction). However, a combination of the optical film (1) and the anisotropic light-scattering film (2) can widen the viewing angle characteristics in all directions that are both in the lateral and vertical directions. The optical film (1) can shift the color to yellow, and also the anisotropic light-scattering film (2) can slightly show yellow. Surprisingly, however, a combination thereof can suppress the color shift to yellow and allows display of high-quality images with the displayed color kept in the neutral position.

In the wide viewing angle compensation polarizing plate, a material that forms the optical film (1) and exhibits the optically-negative uniaxiality is preferably a discotic liquid crystal compound. The material exhibiting optically negative uniaxiality is preferably, but not limited to, a discotic liquid crystal compound, in term of good control of the oblique orientation and in terms of relatively low cost of such a general stuff.

In the wide viewing angle compensation polarizing plate, a material that forms the optical film (1) and exhibits the optically-negative uniaxiality is preferably obliquely oriented in such a manner that its average optical axis makes an average tilt angle of 5° to 50° with the direction of the normal line to the optical film (1).

As stated above, the optical film (1) is used in combination with the anisotropic light-scattering film (2). If the average tilt angle is controlled to be 5° or more in the optical film (1), the viewing angle-widening effect (particularly in the downward direction) can be more significant when the optical film (1) is implemented in liquid crystal displays or the like. On the other hand, if the average tilt angle is controlled to be 50° or less, good viewing angles can be provided in all the vertical and lateral directions (four directions), and variations in viewing angle between good and bad angles depending on the direction can be suppressed. From these viewpoints, the average tilt angle is preferably from 10° to 30°.

The oblique orientation of the optical material exhibiting optically negative uniaxiality (such as discotic liquid crystal molecules) may be a constant tilt without varying with the distance between the optical material and the plane of the film or may vary with the distance between the optical material and the plane of the film.

In the wide viewing angle compensation polarizing plate, the anisotropic light-scattering film (2) is suitable to use that includes inner portions with different refractive indices that are distributed in irregular geometrical and thickness patterns to form light and dark patterns of high and low refractive indices, and the film (2) has a structure in which the portions with different refractive indices are tilted relative to the direction of the thickness of the film and distributed in a layered pattern.

In the wide viewing angle compensation polarizing plate, the optical film (1), the polarizer (3) and the anisotropic light-scattering film (2) are preferably laminated in this order, but not limited to an order of each film of the laminate. If the lamination is performed in above order, the viewing angle characteristics-widening effect can be most satisfactory.

In the wide viewing angle compensation polarizing plate, the anisotropic scattering film (2) preferably has maximum scattering in a direction that makes a maximum scattering angle of 20° to 50° with Z axis, in point of the viewing angle characteristics-widening effect. The maximum scattering angle is preferably from 20° to 40°, more preferably from 25° to 35°.

The present invention also related to a liquid crystal panel, comprising a liquid crystal cell and the above wide viewing angle compensation polarizing plate adhered to the liquid crystal cell. The wide viewing angle compensation polarizing plate is preferably adhered to the viewer side substrate of the liquid crystal cell. In the wide viewing angle compensation polarizing plate, the optical film (1), the polarizer (3) and the anisotropic light-scattering film (2) are laminated in this order from the viewer side of the liquid crystal cell substrate.

While the wide viewing angle compensation polarizing plate of the invention may be provided on any of the viewer side of the substrate and/or the incidence side of the substrate of the liquid crystal cell, the viewing angle characteristics can be more effectively widened if it is provided on the viewer side of the substrate of the liquid crystal cell. If the optical film (1), the polarizer (3) and the anisotropic light-scattering film (2) are laminated in this order from the viewer side of the liquid crystal cell substrate, the viewing angle characteristics can be more effectively widened.

The liquid crystal panel preferably, in point of the viewing angle characteristics-widening effect, has a vector produced by projection of the maximum scattering direction of light passing through the anisotropic scattering film (2) onto an X-Y plane makes an angle of at most 40° with a vector produced by projection of the average director of a liquid crystal molecule in the liquid crystal cell onto the X-Y plane, and a vector produced by projection of the maximum scattering direction of light passing through the anisotropic scattering film (2) onto a Z axis and a vector produced by projection of the average director of the liquid crystal molecule onto the Z axis are oriented in the same direction, wherein the X-Y plane is a plane of the liquid crystal panel, the Z axis is a direction perpendicular to the X-Y plane, and the maximum scattering direction of light passing through the anisotropic scattering film (2) and the average director of the liquid crystal molecule in the liquid crystal cell are each divided into the vector projected onto the X-Y plane and the vector projected onto the Z axis.

A vector produced by projection of the maximum scattering direction of the anisotropic light-scattering film (2) onto an X-Y plane and a vector produced by projection of the average director of a liquid crystal molecule onto the X-Y plane preferably make an angle of 40° or less, more preferably an angle of 30° or less, still more preferably an angle of 20° or less, most preferably an angle of 0°, with each other. The maximum scattering direction of the anisotropic light-scattering film (2) and the average director of the liquid crystal molecule are preferably oriented in such a manner that they are substantially in the same direction with respect to the Z axis and that the values of the vectors projected onto the Z axis are both larger or smaller than those of the vectors projected onto the X-Y plane.

The present invention also related to a liquid crystal display, comprising the above liquid crystal panel.

DESCRIPTION OF REFERENCE MARKS

Reference mark 1 represents an optical film that exhibits negative uniaxiality and has an oblique orientation, 2 an anisotropic light-scattering film, 3 a polarizer, L a liquid crystal cell, θ a maximum scattering angle, and a maximum scattering direction.

BEST MODE FOR CARRYING OUT THE INVENTION

Figure 1:
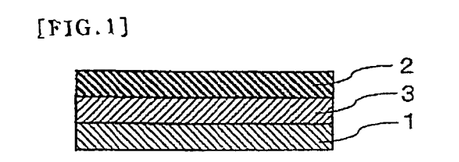
FIG. 1 is a cross-sectional view of an example of the wide viewing angle compensation polarizing plate of the invention.
Figure 2:
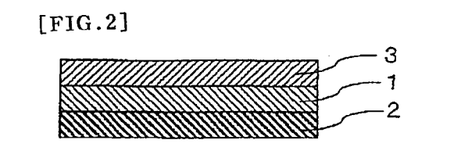
FIG. 2 is a cross-sectional view of another example of the wide viewing angle compensation polarizing plate of the invention.

The wide viewing angle compensation polarizing plate of the invention is described below with reference to the drawings. The wide viewing angle compensation polarizing plate of the invention includes a laminate comprising an optical film (1) that is formed of an obliquely oriented material exhibiting optically-negative uniaxiality, an anisotropic light-scattering film (2) and a polarizer (3). While these films may be laminated in any order without limitation, the optical film (1), the polarizer (3) and the anisotropic light-scattering film (2) are preferably laminated in this order as shown in FIG. 1. Alternatively, as shown in FIG. 2, the anisotropic light-scattering film (2), the optical film (1) and the polarizer (3) may be laminated in this order to form the wide viewing angle compensation polarizing plate of the invention. In FIG. 1 or 2, the anisotropic light-scattering film (2) is stacked on one side of a laminate of the optical film (1) and the polarizer (3). Alternatively, the optical film (1), the anisotropic light-scattering film (2) and the polarizer (3) may be laminated in this order (not shown).

In FIG. 1 or 2, the respective optical films and the polarizing plate may be laminated through a pressure-sensitive adhesive layer(s). The pressure-sensitive adhesive layer may be a single layer or in the form of a laminate of two or more layers.

The material that forms the optical film (1) and exhibits optically negative uniaxiality includes a material having an optical indicatrix in which the refractive index in a single principal axis direction is lower than the refractive indices in the other two directions.

Examples of the material exhibiting optically negative uniaxiality include polyimide materials and liquid-crystalline materials such as discotic liquid crystal compounds. Examples thereof also include products prepared by a process including the steps of mixing any of the above materials as a main component with any other oligomer or polymer to allow them to react and fixing an oblique orientation of the resulting material exhibiting negative uniaxiality to form a film. Where discotic liquid crystal compounds are used, the oblique orientation state of the liquid-crystalline molecules may be controlled by the molecular structure or the type of an alignment film or by the use of an additive (such as a plasticizer, a binder and a surfactant), which is suitably added to the optically anisotropic layer.

The optical film (1) preferably has a front retardation ((nx-ny)d (d: thickness (nm)) of 0 to 200 nm, more preferably of 1 to 150 nm and preferably has a thickness direction retardation ((nx-nz)d) of 10 to 400 nm, more preferably of 50 to 300 nm, wherein nx is a refractive index in the direction of X axis along which the in-plane refractive index of the optical film (1) is maximum, ny is a refractive index in the direction of Y axis perpendicular to X axis, and nz is a refractive index in the direction of Z axis that is the direction of the thickness of the film.

The thickness (d) of the optical film (1) is preferably, but not limited to, from 1 to 200 μm, more preferably from 2 to 150 μm.

Figure 11:
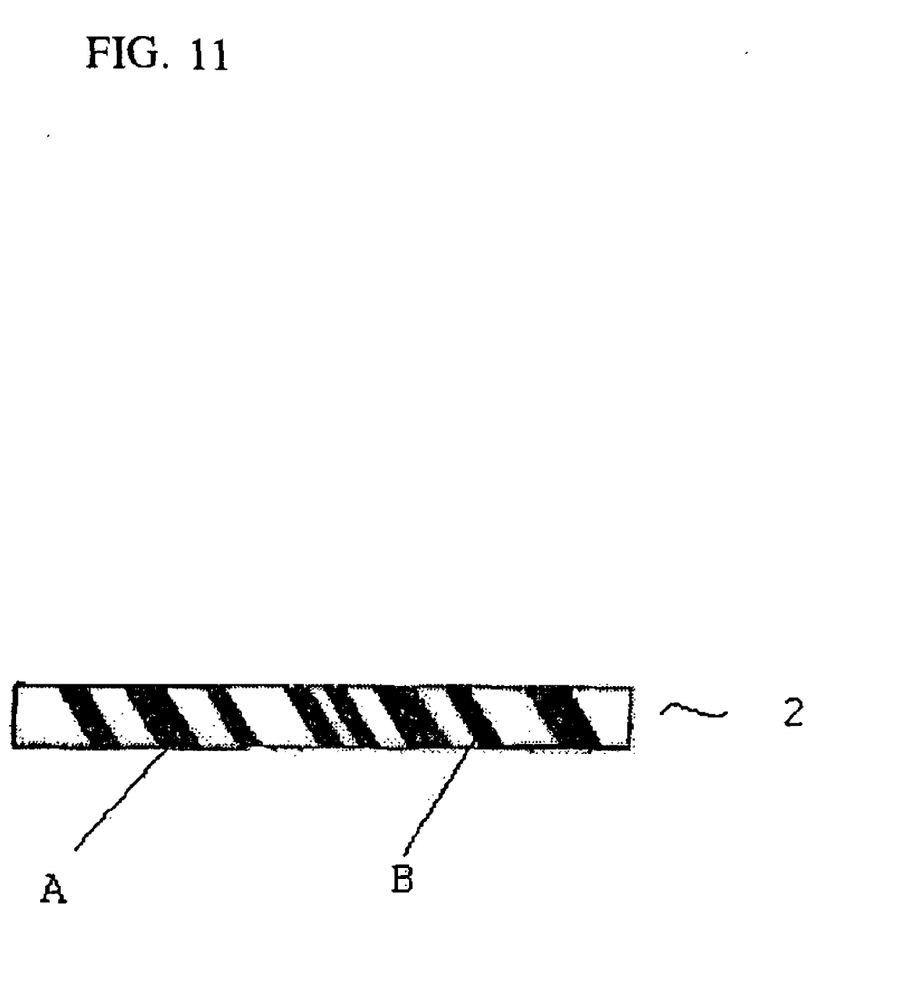
FIG. 11 shows cross-sectional view of an anisotropic film according to an embodiment of the present invention.

In a preferred mode, the anisotropic light-scattering film (2) to be used includes inner portions with different refractive indices that are distributed in irregular geometrical and thickness patterns to form light and dark patterns of high and low refractive indices, and the film (2) also has a structure in which the portions with different refractive indices are tilted relative to the direction of the thickness of the film and distributed in a layered pattern. The anisotropic light-scattering film (2) has light scattering properties and incidence angle selectivity so as to scatter incident light at an incident angle along the above oblique direction and so as to function as a mere transparent film with respect to incident light at an incident angle perpendicular to the above oblique direction. The refractive index distribution is preferably uniform in the direction where the portions with different refractive indices are tilted in a layered pattern. Alternatively, the refractive index distribution is preferably irregular in the direction where the portions with different refractive indices are tilted in a layered pattern. In a preferred mode, the portions with different refractive indices are each irregular in size and each has a vertically (or laterally) long shape so that their light-scattering characteristics can be anisotropic because of vertically (or laterally) longed light-scattering characteristics in each portion. Such an anisotropic light-scattering film is disclosed in JP-A No. 2000-171619 and illustrated in FIG. 11, which shows areas of high refractive index (A) and areas of low refractive index (B) tilted with respect to thickness of the film (2) and irregularly distributed in the film (2).

Figure 5:
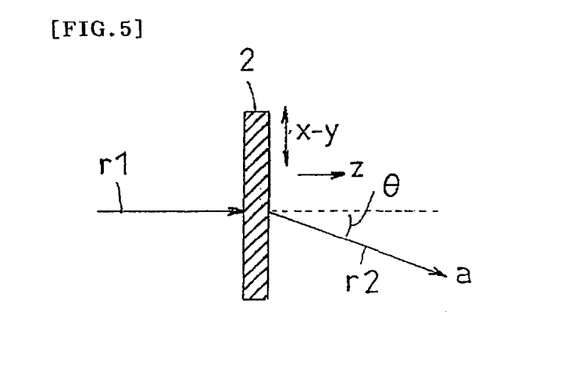
FIG. 5 is a schematic diagram showing scattering in the anisotropic light-scattering film (2)

As described above, light entering the anisotropic light-scattering film (2) is transmitted and scattered depending on the incidence angle. FIG. 5 is a schematic diagram showing that light (r1) entering the anisotropic light-scattering film (2) is transmitted and scattered. The transmitted light (r2) exhibits a maximum scattering direction (a) for scattering light. θ is a maximum scattering angle made by the transmitted light (r2) exhibiting the maximum scattering direction and the direction of the normal line (Z axis) to the anisotropic light-scattering film (2). The maximum scattering angle is preferably in the range of 20° to 50°.

The material for the anisotropic light-scattering film (2) may be suitably selected such that the refractive index difference can be in the range of 0.001 to 0.2 to satisfy the above conditions and that the thickness of the film can be in the range of 1 μm to 1000 μm depending on the refractive index difference as same. While the sizes of the portions with different refractive indices may be random and irregular for light scattering, their average size in diameter is suitably selected within the range of 0.1 μm to 300 μm in order to produce the desired scattering properties.

For example, the anisotropic light-scattering film (2) may be prepared using a random mask pattern. Specifically, ultra-violet light from a UV light source is collimated by a collimating optical system and applied to a master mask. The master mask includes a glass substrate and a randomly-patterned chromium pattern. A photosensitive material is placed in an adhering manner on the side opposite to the UV irradiation side of the master mask and exposed to the light through the pattern of the master mask. In this process, the master mask is inclined by a specific angle α with respect to the collimated UV light so that the patterned exposure is carried out so as to form an exposed portion inclined by the specific angle in the photosensitive material. This angle corresponds to the tilt angle of the portions with different refractive indices in the light-scattering film (namely, corresponds to the incidence angle-dependent maximum scattering angle θ). The photosensitive material to be used can achieve recording in the form of a difference in refractive index between the UV-exposed portion and the unexposed portion, have a resolution higher than the light and dark pattern to be recorded, and achieve recording of a pattern in the direction of its thickness. Such a recording material may be a photosensitive material for volume hologram, and examples thereof include 8E56 Dry Plate manufactured by Agfa (a silver salt photosensitive material for hologram), HRF Film manufactured by DuPont (a photosensitive material for hologram) or gelatin dichromate and DMP-128 Recording Material manufactured by Polaroid Corporation. The master mask with a random pattern to be used may be prepared by a process including the steps of making black and white pattern data by random number calculation with a computer and forming a chromium metal pattern on a glass substrate by etching according to the so-called photolithographic method based on the data. It will be understood that the method for preparing the master mask is not limited to the above method, and a similar mask may also be prepared by a photographic method using a lithographic plate or any other method.

The anisotropic light-scattering film (2) may also be prepared using a speckle pattern. Specifically, a ground glass is irradiated with a laser beam from a laser source, while a photosensitive material is placed at a specific distance from the side opposite to the laser-irradiation side of the ground glass. The laser beam is transmitted and scattered by the ground glass to form a complicated interference pattern, which is speckle pattern, of the beam to which the photosensitive material is exposed. In this process, the photosensitive material is inclined by a specific angle α with respect to the ground glass, so that the exposure to the speckle pattern is carried out so as to form an exposed portion inclined by the specific angle in the photosensitive material. This angle corresponds to the tilt of the portions with different refractive indices in the light-scattering film (namely, corresponds to the incidence angle-dependent maximum scattering angle θ). The laser source for use in the recording may be an argon ion laser, the wavelength of which may be properly selected from 514.5 nm, 488 nm and 457.9 nm depending on the sensitivity of the photosensitive material. Any laser source other than the argon ion laser may also be used as long as it is highly coherent, and for example, a helium-neon laser, a krypton ion laser or the like may be used.

While the polarizer (3) is may be used by itself, it is generally used in combination with a protective film(s), which is provided on one or both sides of the polarizer. Any substrate film for other optical layers may be used as it is for the protective film.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials such as iodine, dye, is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

Protective film(s), which is provided on one or both sides of the polarizer, is preferable that has transparency, mechanical strength, heat stability and moisture interception property, isotropy etc. As materials of the above-mentioned transparent protective film, for example, polyester type polymers, such as polyethylene terephthalate and polyethylenenaphthalate; cellulose type polymers, such as diacetyl cellulose and triacetyl cellulose; acrylics type polymer, such as poly methyl-methacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned. The protective film is formed as a cured layer made of heat curing type or ultraviolet ray curing type resins, such as acryl based, urethane based, acryl urethane based, epoxy based, and silicone based, etc.

Moreover, as is described in Japanese Patent Laid-Open Publication No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

The protective films, especially preferably used, is triacetyl cellulose film whose surface is saponified with alkaline from the viewpoint of a polarization characteristic, a durability or the like. Thickness of the protective film can be properly determined and generally on the order in the range of from about 1 to about 500 μm from the viewpoint of a strength, workability such as handlability, requirement for a thin film and the like. Especially, the thickness is preferably is in the range of from 20 to 300 μm and more preferably in the range of from 30 to 200 μm.

Moreover, it is preferable that the protective film may have as little coloring as possible. Accordingly, a protective film having a retardation value in a film thickness direction represented by $Rth=[(nx+ny)/2-nz] \times d$ of from −90 nm to +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a retardation value (Rth) of from −90 nm to +75 nm in a thickness direction. The retardation value (Rth) in a thickness direction is preferably from −80 nm to +60 nm, and especially preferably from −70 nm to +45 nm.

As transparent protective films, a cellulose-based polymer such as triacetyl cellulose is preferable from the standpoint of a polarization characteristic, a durability or the like. Especially preferable is a triacetyl cellulose film. Note that in a case where protective films are provided on both sides of a polarizer, the protective films made from the same polymer may be used on both sides thereof or alternatively, the protective films made from polymer materials different from each other may also be used on respective both sides thereof. The polarizer and the protective film are generally bonded together through a water-based pressure-sensitive adhesive or the like. Examples of the water-based adhesive include polyvinyl alcohol adhesives, gelatin adhesives, vinyl adhesives, latex adhesives, water-based polyurethane, and water-based polyester.

A hard coat layer may be prepared, or antireflection processing, processing aiming at sticking prevention, diffusion or anti glare may be performed onto the protective film.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-crosslinked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Proper method may be carried out to form an adhesive layer. As an example, about 10 to about 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on a polarizing plate or an optical film may be mentioned.

The adhesive layer may also contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Thickness of the adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, ultraviolet absorbing property may be given to the above-mentioned each layer, such as the above optical films and an adhesive layer etc., using a method of adding UV absorbents, such as salicylic acid ester type compounds, benzophenol type compounds, benzotriazol type compounds, cyano acrylate type compounds, and nickel complex salt type compounds.

The wide viewing angle compensation polarizing plate of the invention is suitable for use in liquid crystal panels or liquid crystal displays. It is preferably used to form a variety of devices such as transflective liquid crystal displays. Transflective liquid crystal displays are suitable for use in mobile information and communications equipment and personal computers.

Figure 3:
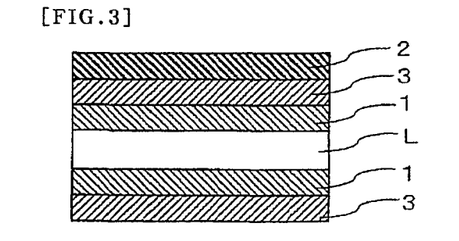
FIG. 3 is a cross-sectional view of an example of the liquid crystal panel of the invention.
Figure 4:
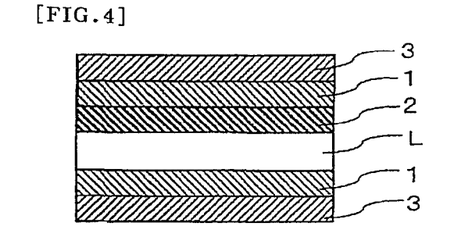
FIG. 4 is a cross-sectional view of another example of the liquid crystal panel of the invention.

The wide viewing angle compensation polarizing plate according to the invention is preferably placed on a viewer side substrate of a liquid crystal cell. FIG. 3 or 4 shows a liquid crystal panel comprising a liquid crystal cell (L) and the wide viewing angle compensation polarizing plate as shown in FIG. 1 or 2 that is adhered to the viewer side (upper) substrate of the liquid crystal cell (L). FIG. 3 shows a case where the optical film (1) side of the wide viewing angle compensation polarizing plate as shown in FIG. 1 is adhered to the viewer side (upper) substrate of the liquid crystal cell (L). FIG. 4 shows a case where the anisotropic light-scattering film (2) side of the wide viewing angle compensation polarizing plate as shown in FIG. 2 is adhered to the viewer side (upper) substrate of the liquid crystal cell (L).

A liquid crystal molecule is sealed in the liquid crystal cell (L). In the case of a transflective liquid crystal display illustrated as an example, a transparent electrode is provided on the viewer side (upper) liquid crystal cell substrate, while a reflecting layer, which also serves as an electrode, is provided on the incidence side (lower) liquid crystal cell substrate. In the liquid crystal panel, at least a polarizer (3) is placed on the side of the incidence side (lower) substrate of the liquid crystal cell (L). Other elements for a liquid crystal display, such as an elliptically polarizing plate, various types of optical films, and a backlight, may be placed below the lower side liquid crystal cell substrate. In the liquid crystal panel of FIG. 3 or 4, the optical film (1) and the polarizer (3) are laminated in this order from the side of the incidence side (lower) liquid crystal cell substrate of the liquid crystal cell (L).

Figure 6:
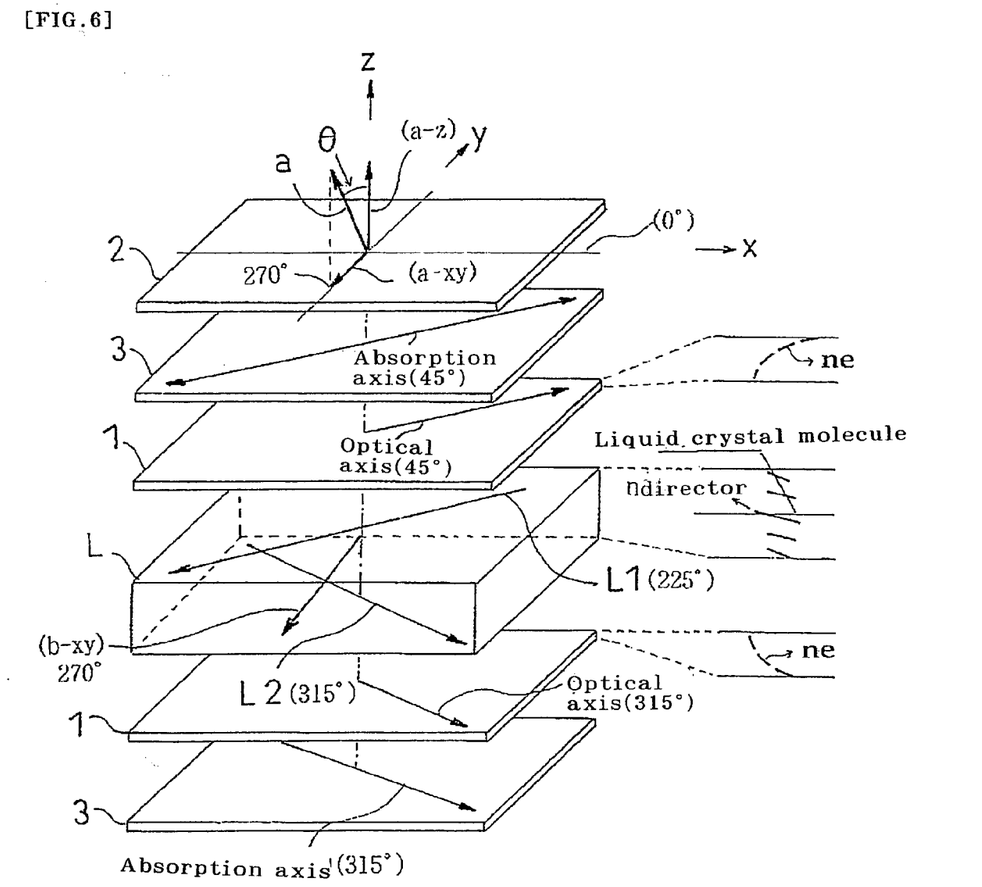
FIG. 6 is a schematic diagram showing an example of the direction of each axis in the liquid crystal panel of FIG. 3.

FIG. 6 is a schematic diagram showing a preferred mode of the relationship between the maximum scattering direction of light passing through the anisotropic light-scattering film (2) and the average director of the liquid crystal molecule in the liquid crystal cell (L) with respect to the liquid crystal panel illustrated in FIG. 3. In this case, the plane of the liquid crystal panel corresponds to the X-Y plane, and the direction perpendicular to the X-Y plane corresponds to the Z axis. In FIG. 6, the X-Y plane and the Z axis are shown on the anisotropic light-scattering film (2).

The maximum light scattering direction (a) of light passing through the anisotropic light-scattering film (2) may be divided into a vector (a-xy) projected onto the X-Y plane and a vector (a-z) projected onto the Z axis. The average director (b) of the liquid crystal molecule in the liquid crystal cell (L) may also be divided into a vector (b-xy) projected onto the X-Y plane and a vector (b-z) projected onto the Z axis. The vector (b-z) is not shown in the drawing. As stated above, the directions of the vector (a-xy) and the vector (b-xy) preferably make an angle of 40° or less with each other.

The vector (b-xy) with respect to the average director (b) of the liquid crystal molecule corresponds to a director of the liquid crystal molecule at the midpoint in the direction of the thickness of the liquid crystal cell. FIG. 6 shows a case where a TN liquid crystal cell is used in which the liquid crystal molecule is twisted 90° from the upper to lower cell substrate. The rightward direction of the X axis is defined as 0° (corresponding to the rightward direction on the display screen), and each direction is shown below counterclockwise from it. With respect to the rubbing direction of the TN cell, the twist of the liquid crystal molecule is in a direction (L-1) of 225° at the viewer side (the upper substrate side) to be attached to the anisotropic light-scattering film (2) and in a direction (L-2) of 315° at the incidence side (lower substrate side). In this case, the liquid crystal molecules are tilted from the incidence side (lower substrate side) to the viewer side (upper substrate side) substantially at the center in the direction of the thickness of the liquid crystal panel (the Z axis) respond to a direction of 270°. In FIG. 6, therefore, the vector (b-xy) with respect to the average director (b) of the liquid crystal molecule is in a direction of 270°. On the other hand, the wide viewing angle compensation polarizing plate is placed in such a manner that the vector (a-xy) with respect to the maximum scattering direction (a) of the anisotropic light-scattering film (2) is in a direction of 270°. Thus, FIG. 6 illustrates a case where the vectors (a-xy) and (b-xy) make an angle of 0° with each other.

In a preferred mode, the vector produced by the projection of the maximum scattering direction (a) of light passing through the anisotropic light-scattering film (2) onto the Z axis and the vector produced by the projection of the average director (b) of the liquid crystal molecule onto the Z axis are both oriented in the same direction. In FIG. 6, the vector (b-z) produced by the projection of the average director (b) of the liquid crystal molecule in the liquid crystal cell (L) onto the Z axis is in the upward direction. In such a case, it is preferred that the anisotropic light-scattering film to be used have the vector (a-z) also in the upward direction. In FIG. 6, the vector (a-z) of the anisotropic light-scattering film (2) is also in the upward direction.

In FIG. 6, the optical axis of the optical film (1) and the absorption axis of the polarizer (3) are allowed to coincide with the rubbing directions of the TN cell (at the upper and lower substrates), respectively. Specifically, for optical compensation for the orientations of the liquid crystal molecule in the liquid crystal cell, the optical axis of the optical film (1) and the absorption axis of the polarizer (3) are in a direction of 45° on the viewer side (upper substrate side) and in a direction of 315° on the incidence side (lower substrate side), respectively. In the optical film (1), the optical axis of the discotic liquid crystal is in the direction of the orientation of the obliquely oriented discotic liquid crystal molecule, namely in the direction of the average vector where ne (extraordinary light refractive index) is exhibited. On the viewer side (upper substrate side), the optical film (1) is placed in such a manner that the tilt angle of the discotic liquid crystal molecule increases as it goes to the upper side. On the incidence side (lower substrate side), the optical film (1) is placed in such a manner that the tilt angle of the discotic liquid crystal molecule increases as it goes to the lower side.

FIGS. 3 and 4 each show an illustrative example of the liquid crystal panel, and the wide viewing angle compensation polarizing plate of the invention may also be applied to various other types of liquid crystal displays. The application is not limited to the TN mode liquid crystal panel as shown in FIG. 6.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Assembling of a liquid crystal display may be carried out according to conventional methods. That is, a liquid crystal display is generally manufactured by suitably assembling several parts such as a liquid crystal cell, optical elements and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, with which a backlight or a reflector is used for a lighting system has been located at rear side of the liquid crystal cell, and may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

EXAMPLES

The structure and effects of the invention are specifically described below with reference to the examples and the like. Unless otherwise stated, "part or parts" and "%" in each example are by weight.

While the invention is specifically described using the examples below, it will be understood that the scope of the invention is not limited by the description thereof. In each example, "part or parts" means part or parts by weight.

In the optical film (1), the average tilt angle formed by the average optical axis of the obliquely oriented optical material with respect to the direction of the normal to the optical film (1) was determined by a process including the steps of: measuring its retardation with the above measuring device while inclining the optical film (1) by an angle of −50° to 50° clockwise or counterclockwise with respect to a slow axis of the optical film (1); and defining, as the average tilt angle, the absolute value of an angle at which the retardation becomes minimal. In the measurement, the measured angle at which the direction of the incidence of light from the light source of the measuring device coincided with the normal line to the plane of the film was normalized as 0°.

The maximum scattering direction and maximum scattering angle of the anisotropic light-scattering film (2) were measured with Optic manufactured by Color-GONIO.

The refractive index and retardation of each optical film were determined by measuring the principal in-plane and thickness direction refractive indices nx, ny and nz of the film at a wavelength of 590 nm (λ=590 nm) with an automatic birefringence measurement system (Automatic Birefringence Analyzer KOBRA 21ADH manufactured by Oji Scientific Instruments).

Example 1

Optical Film (1) Comprising Obliquely Oriented Material Exhibiting Optically Negative Uniaxiality WVSA 12B (110 μm in thickness) manufactured by Fuji Photo Film Co., Ltd. was used. This film was produced by applying a discotic liquid crystal to a support (a triacetylcellulose (TAC) film) and had a front retardation of 30 nm, a thickness direction retardation of 160 nm and an average tilt angle of 20°.

(Anisotropic Light-Scattering Film (2))

An anisotropic light-scattering film manufactured by TOPPAN PRINTING CO., LTD. (SDF Film (trade name) 25 μm in thickness) was used. The anisotropic light-scattering film included inner portions with different refractive indices that were distributed in irregular geometrical and thickness patterns to form light and dark patterns of high and low refractive indices, and the film also had a structure in which the portions with different refractive indices were tilted relative to the direction of the thickness of the film and distributed in a layered pattern. The film had the characteristics: a front haze of 46% and a maximum scattering angle of 30°. The front haze value was a measurement obtained by means of Haze Meter HR100 (manufactured by Murakami Color Research Laboratory).

(Polarizer (3))

A stretched polyvinyl alcohol film (25 μm in thickness) dyed with iodine was used as the polarizer.

(Antireflection Film (4))

The antireflection film used comprised an 80 μm-thick TAC film and an antireflection layer with an antistatic function formed on the TAC film through a 5 μm-thick hard-coating layer produced with urethane acrylate.

(Wide Viewing Angle Compensation Polarizing Plate)

As shown in FIG. 1, the optical film (1), the polarizer (3) and the anisotropic light-scattering film (2) were laminated in this order. In the lamination, the TAC film side of the optical film (1) and the polarizer (3) were bonded together through a water-soluble polyvinyl alcohol adhesive. An 80 μm-thick TAC film was then bonded to the polarizer (3) with a water-soluble polyvinyl alcohol adhesive, and then the anisotropic light-scattering film (2) was adhered to the polarizer (3) through an acrylic pressure-sensitive adhesive layer (20 μm in thickness). The TAC film side of the antireflection film (4) was further adhered to the anisotropic light-scattering film (2) through an acrylic pressure-sensitive adhesive layer (20 μm in thickness).

The optical film (1) and the polarizer (3) were placed such that the direction of the optical axis of the optical film (1) was parallel to the direction of the absorption axis of the polarizer (3). The maximum scattering direction of the anisotropic light-scattering film was set in such a manner that it became 270° when the optical axis of the optical film (1) and the absorption axis of the polarizer (3) were each directed at 45° from the long axis.

A surface protective film comprising a polyethylene terephthalate substrate was provided on the antireflection film (4) side. On the other hand, a separator comprising a polyethylene terephthalate substrate was provided on the optical film (1) side through an acrylic pressure-sensitive adhesive layer (20 μm in thickness).

(Liquid Crystal Panel)

The liquid crystal cell used was a TN mode liquid crystal (TFT liquid crystal) cell having the average director, as shown in FIG. 6. Specifically, the vector produced by the projection of the average director of the liquid crystal molecule onto the X-Y plane was in a direction of 270°. The value of the vector produced by the projection of the average director of the liquid crystal molecule onto the Z axis was larger than that produced by the projection of it onto the X-Y plane.

The optical film (1) side of the wide viewing angle compensation polarizing plate was adhered to the viewer side (upper) substrate of the TN mode liquid crystal cell in such a manner that the maximum scattering direction of the anisotropic light-scattering film (2) was in a direction of 270° (in the direction of widening the lower viewing angle) as shown in FIG. 6. Thus, the average director of the liquid crystal molecule made an angle of 0° with the maximum scattering direction of the anisotropic light-scattering film (2). The maximum scattering direction of the anisotropic light-scattering film (2) and the average director of the liquid crystal molecule were directed such that the values of the vectors produced by the projection onto the Z axis were both larger than those of the vectors produced by the projection onto the X-Y plane.

The optical film (1) and the polarizer (3) were also stacked on the incidence side (lower) substrate of the liquid crystal cell as shown in FIG. 6. In the lamination, the discotic liquid crystal layer side of the optical film (1) was adhered to the incidence side (lower) substrate of the liquid crystal cell through an acrylic pressure-sensitive adhesive layer (20 μm in thickness). The TAC film side of the optical film (1) and the polarizer (3) were then bonded together through a water-soluble polyvinyl alcohol adhesive. An 80 μm-thick TAC film was then bonded to the polarizer (3) with a water-soluble polyvinyl alcohol adhesive.

Example 2

Wide Viewing Angle Compensation Polarizing Plate

As shown in FIG. 2, the anisotropic light-scattering film (2) as used in Example 1, the optical film (1) and the polarizer (3) were laminated in this order.

In the lamination, the discotic liquid crystal layer side of the optical film (1) was adhered to the anisotropic light-scattering film (2) through an acrylic pressure-sensitive adhesive layer (20 μm in thickness). The polarizer (3) was then bonded to the TAC film side of the optical film (1) through a water-soluble polyvinyl alcohol adhesive. The TAC film side of the antireflection film (4) was then bonded to the polarizer (3) through a water-soluble polyvinyl alcohol adhesive.

The optical film (1) and the polarizer (3) were placed such that the direction of the optical axis of the optical film (1) was parallel to the direction of the absorption axis of the polarizer (3). The maximum scattering direction of the anisotropic light-scattering film was set in such a manner that it became 270° when the optical axis of the optical film (1) and the absorption axis of the polarizer (3) were each directed at 45° from the long axis.

A surface protective film comprising a polyethylene terephthalate substrate was provided on the antireflection film (4) side. On the other hand, a separator comprising a polyethylene terephthalate substrate was provided on the optical film (1) side through an acrylic pressure-sensitive adhesive layer (20 μm in thickness).

(Liquid Crystal Panel)

As shown in FIG. 4, the anisotropic light-scattering film (2) side of the wide viewing angle compensation polarizing plate was adhered to the viewer side substrate of the TN mode liquid crystal cell as used in Example 1. The maximum scattering direction of the anisotropic light-scattering film (2) was set to be in a direction of 270° (in the direction of widening the lower viewing angle). Thus, the average director of the liquid crystal molecule made an angle of 0° with the maximum scattering direction of the anisotropic light-scattering film (2). The maximum scattering direction of the anisotropic light-scattering film (2) and the average director of the liquid crystal molecule were directed such that the values of the vectors produced by the projection onto the Z axis were both larger than those of the vectors produced by the projection onto the X-Y plane. The optical film (1) and the polarizer (3) were also stacked on the incidence side (lower) substrate of the liquid crystal cell in the same manner as Example 1.

Comparative Example 1

Wide Viewing Angle Compensation Polarizing Plate

A wide viewing angle compensation polarizing plate was prepared using the process of Example 1, except that the anisotropic light-scattering film (2) was not adhered.

(Liquid Crystal Panel)

Figure 7:
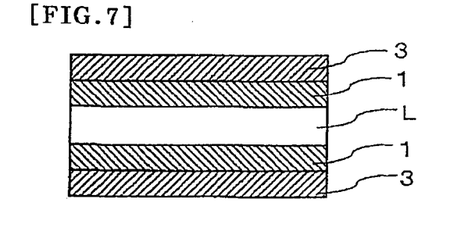
FIG. 7 is a cross-sectional view of an exemplary liquid crystal panel according to a comparative example.

As shown in FIG. 7, the optical film (1) side of the wide viewing angle compensation polarizing plate was adhered to the viewer side substrate of the TN mode liquid crystal cell as used in Example 1. The optical film (1) and the polarizer (3) were bonded together in such a manner that the optical axis of the optical film (1) and the absorption axis of the polarizer (3) were each directed at 45° from the long axis. The optical film (1) and the polarizer (3) were also stacked on the incidence side substrate of the liquid crystal cell in the same manner as Example 1.

(Evaluation)

The liquid crystal panels were evaluated for viewing angle characteristics with a black and white contrast (turning angles by black-and-white binary display or angle distribution very close thereto). In the evaluation of the viewing angle characteristics, areas with a contrast of at least 10 were measured with EZcontrast 160D manufactured by ELDIM, while the liquid crystal panel was placed in the dark field horizontally with respect to the optical axis of the measuring instrument.

The results are shown in Table 1. The thickness of the wide viewing angle compensation polarizing plate in each example is also shown in Table 1.

TABLE 1

| | Number of Areas with a Contrast of 10 or More | | Thickness of Wide |
| --- | --- | --- | --- |
| | Vertical Direction (°) | Lateral Direction (°) | Viewing Angle Polarizing Plate (μm) |
| Example 1 | 130(−50 to +80) | 130(−65 to +65) | 396 |
| Example 2 | 125(−50 to +75) | 130(−65 to +65) | 293 |
| Comparative Example 1 | 110(−50 to +60) | 130(−65 to +65) | 268 |

In Table 1, the upward direction is represented by minus (−) with respect to the vertical direction, while the leftward direction is represented by minus (−) with respect to the lateral direction. It was demonstrated that the viewing angle characteristics in the downward direction was wider in each of Examples 1 and 2 than in Comparative Example 1. Although the viewing angle characteristics were slightly worse in Example 2 than in Example 1, Example 2 had the merit of small thickness.

Figure 8:
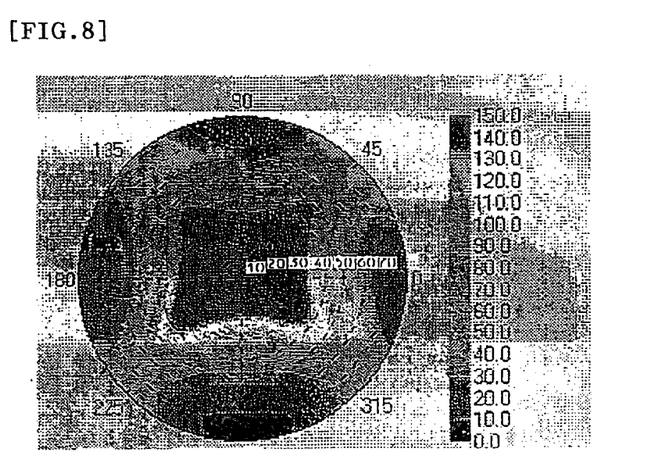
FIG. 8 is a chart showing the viewing angle distribution characteristics of the liquid crystal panel of Example 1.
Figure 9:
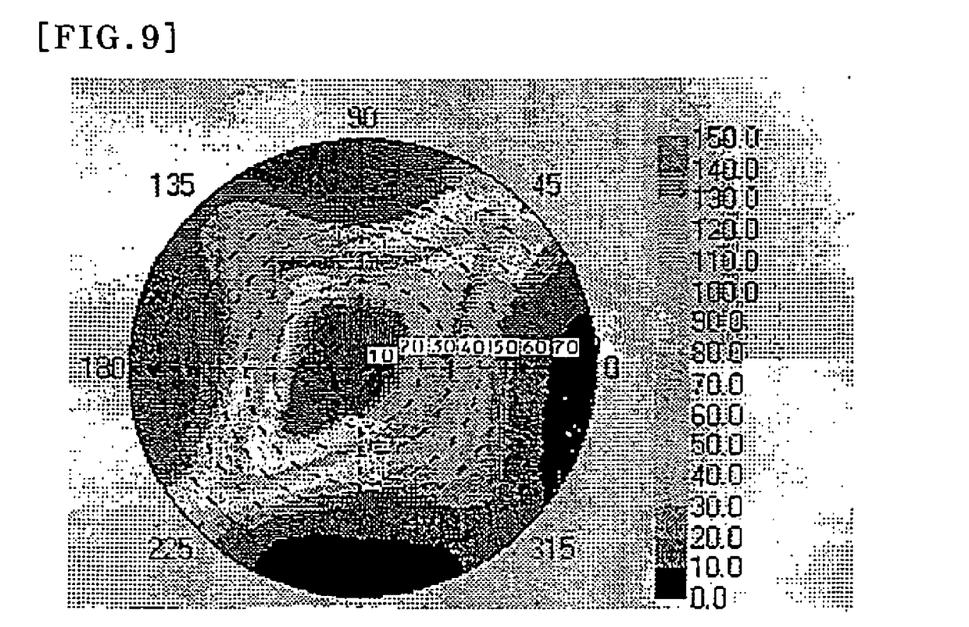
FIG. 9 is a chart showing the viewing angle distribution characteristics of the liquid crystal panel of Example 2.
Figure 10:
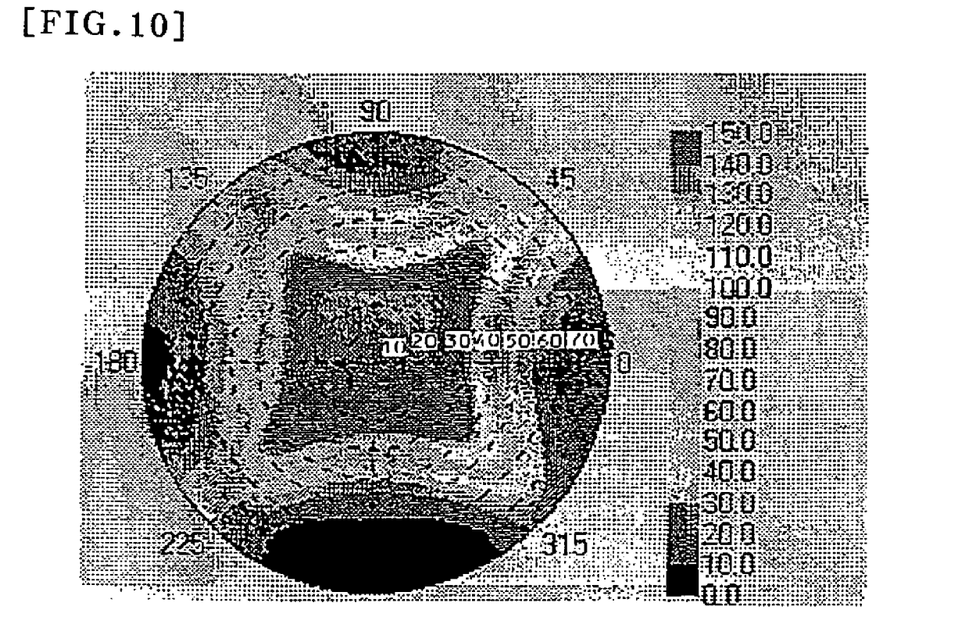
FIG. 10 is a chart showing the viewing angle distribution characteristics of the liquid crystal panel of Comparative Example 1.

The viewing angle distribution characteristics were also evaluated with EZcontrast 160D manufactured by ELDIM. The results are shown in FIGS. 8 to 10. FIG. 8 corresponds to Example 1, FIG. 9 corresponds to Example 2 and FIG. 10 corresponds to Comparative Example 1, respectively. FIGS. 8 to 10 indicate that color shift to yellow is suppressed in Examples 1 and 2 as compared with Comparative Example 1.

INDUSTRIAL APPLICABILITY

The wide viewing angle compensation polarizing plate of the invention is useful for liquid crystal panels and particularly useful when it is stacked on the viewer side of a liquid crystal cell to form a liquid crystal panel. The liquid crystal panels according to the invention are suitable for use in liquid crystal displays.

The invention claimed is:

1. A liquid crystal panel, comprising a liquid crystal cell and a wide viewing angle compensation polarizing plate, said wide viewing angle compensation polarizing plate comprising:

a laminate comprising an optical film (1) that is formed of an obliquely oriented material exhibiting optically-negative uniaxiality, an anisotropic light-scattering film (2) and a polarizer (3);

wherein the optical film (1), the polarizer (3) and the anisotropic light-scattering film (2) are laminated in this order;

wherein the wide viewing angle compensation polarizing plate is adhered to a viewer side substrate of the liquid crystal cell; and wherein a vector produced by projection of the maximum scattering direction of light passing through the anisotropic scattering film (2) onto an X-Y plane makes an angle of at most 40° with a vector produced by projection of the average director of a liquid crystal molecule in the liquid crystal cell onto the X-Y plane, a vector produced by projection of the maximum scattering direction of light passing through the anisotropic scattering film (2) onto a Z axis and a vector produced by projection of the average director of the liquid crystal molecule onto the Z axis are oriented in the same direction, and the X-Y plane is a plane of the liquid crystal panel, the Z axis is a direction perpendicular to the X-Y plane, and the maximum scattering direction of light passing through the anisotropic scattering film (2) and the average director of the liquid crystal molecule in the liquid crystal cell are each divided into the vector projected onto the X-Y plane and the vector projected onto the Z axis.

2. The liquid crystal panel according to claim 1, wherein a material that forms the optical film (1) and exhibits the optically-negative uniaxiality is a discotic liquid crystal compound.

3. The liquid crystal panel according to claim 1, wherein a material that forms the optical film (1) and exhibits the optically-negative uniaxiality is obliquely oriented in such a manner that its average optical axis makes an average tilt angle of 5° to 50° with the direction of the normal line to the optical film (1).

4. The liquid crystal panel according to claim 1, wherein the anisotropic light-scattering film (2) includes inner portions with different refractive indices that are distributed in irregular geometrical and thickness patterns to form light and dark patterns of high and low refractive indices, and the film (2) has a structure in which the portions with different refractive indices are tilted relative to the direction of the thickness of the film and distributed in a layered pattern.

5. The liquid crystal panel according to claim 1, wherein the anisotropic scattering film (2) has maximum scattering in a direction that makes a maximum scattering angle of 20° to 50° with Z axis.

6. The liquid crystal panel according to claim 1, wherein the optical film (1), the polarizing film (3) and the anisotropic light-scattering film (2) are laminated in this order from a viewer side of the liquid crystal cell substrate.

7. The liquid crystal panel according to claim 1, wherein the vector produced by projection of the maximum scattering direction of light passing through the anisotropic scattering film (2) onto the X-Y plane makes an angle of 0° with the vector produced by projection of the average director of the liquid crystal molecule in the liquid crystal cell onto the X-Y plane.

8. A liquid crystal display, comprising the liquid crystal panel according to claim 1.

9. A liquid crystal display, comprising the liquid crystal panel according to claim 6.

10. A liquid crystal display, comprising the liquid crystal panel according to claim 7.

* * * * *